United States Patent
Strusinski

(10) Patent No.: US 11,794,287 B2
(45) Date of Patent: Oct. 24, 2023

(54) NICKEL BASED SUPERALLOY WELD FILLER

(71) Applicant: Siemens Energy, Inc., Orlando, FL (US)

(72) Inventor: Thaddeus Strusinski, Pfafftown, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 177 days.

(21) Appl. No.: 17/332,231

(22) Filed: May 27, 2021

(65) Prior Publication Data
US 2021/0283728 A1    Sep. 16, 2021

Related U.S. Application Data

(63) Continuation of application No. 17/051,468, filed as application No. PCT/US2018/030385 on May 1, 2018.

(51) Int. Cl.
| | |
|---|---|
| C22C 19/05 | (2006.01) |
| B23K 35/30 | (2006.01) |
| B23K 101/00 | (2006.01) |
| B23K 103/08 | (2006.01) |

(52) U.S. Cl.
CPC .......... *B23K 35/304* (2013.01); *C22C 19/056* (2013.01); *B23K 2101/001* (2018.08); *B23K 2103/08* (2018.08)

(58) Field of Classification Search
CPC .................................. C22C 19/056; C22F 1/10
See application file for complete search history.

(56) References Cited

U.S. PATENT DOCUMENTS

| | | | |
|---|---|---|---|
| 1,361,269 A | 12/1920 | Mattice | |
| 2,683,207 A | 7/1954 | Lewis et al. | |
| 2,884,692 A | 5/1959 | Haase et al. | |
| 4,910,098 A | 3/1990 | Lee et al. | |
| 5,897,801 A * | 4/1999 | Smashey ................. | B23K 9/23 |
| | | | 219/137 WM |
| 9,902,021 B2 | 2/2018 | Goncharov et al. | |
| 2014/0366996 A1 | 12/2014 | Goncharov et al. | |
| 2016/0167172 A1 | 6/2016 | Goncharov et al. | |
| 2017/0100804 A1 | 4/2017 | Goncharov et al. | |

FOREIGN PATENT DOCUMENTS

| | | |
|---|---|---|
| DE | 102013214464 A1 | 1/2015 |
| EP | 1801251 A1 | 6/2007 |
| EP | 3178589 A1 | 6/2017 |
| WO | 8903264 A1 | 4/1989 |

OTHER PUBLICATIONS

PCT International Search Report and Written Opinion of International Searching Authority dated Jan. 18, 2023 corresponding to PCT International Application No. PCT/US2022/072311 filed May 13, 2022.

* cited by examiner

*Primary Examiner* — Jessee R Roe

(57) ABSTRACT

A weld filler is proposed which significantly improves the weldability of some nickel-based superalloys and includes the following constituents (in wt %): 14.6%-15.6% chromium (Cr), 10.4%-11.4% cobalt (Co) 4.6%-5.0%, molybdenum (Mo), 4.4%-5.2% tungsten (W), 1.4%-1.8% tantalum (Ta), 3.0%-3.7% aluminum (Al), 0.7-1.3% titanium (Ti), 0.14%-0.16% carbon (C), 0.0425-0.0575% zirconium, 0.7%-1.2% hafnium (Hf), at most 0.15% iron, at most 0.1% manganese, at most 0.1% silicon, at most 0.1% vanadium, at most 0.015% boron, trace elements, and remainder nickel.

12 Claims, 3 Drawing Sheets

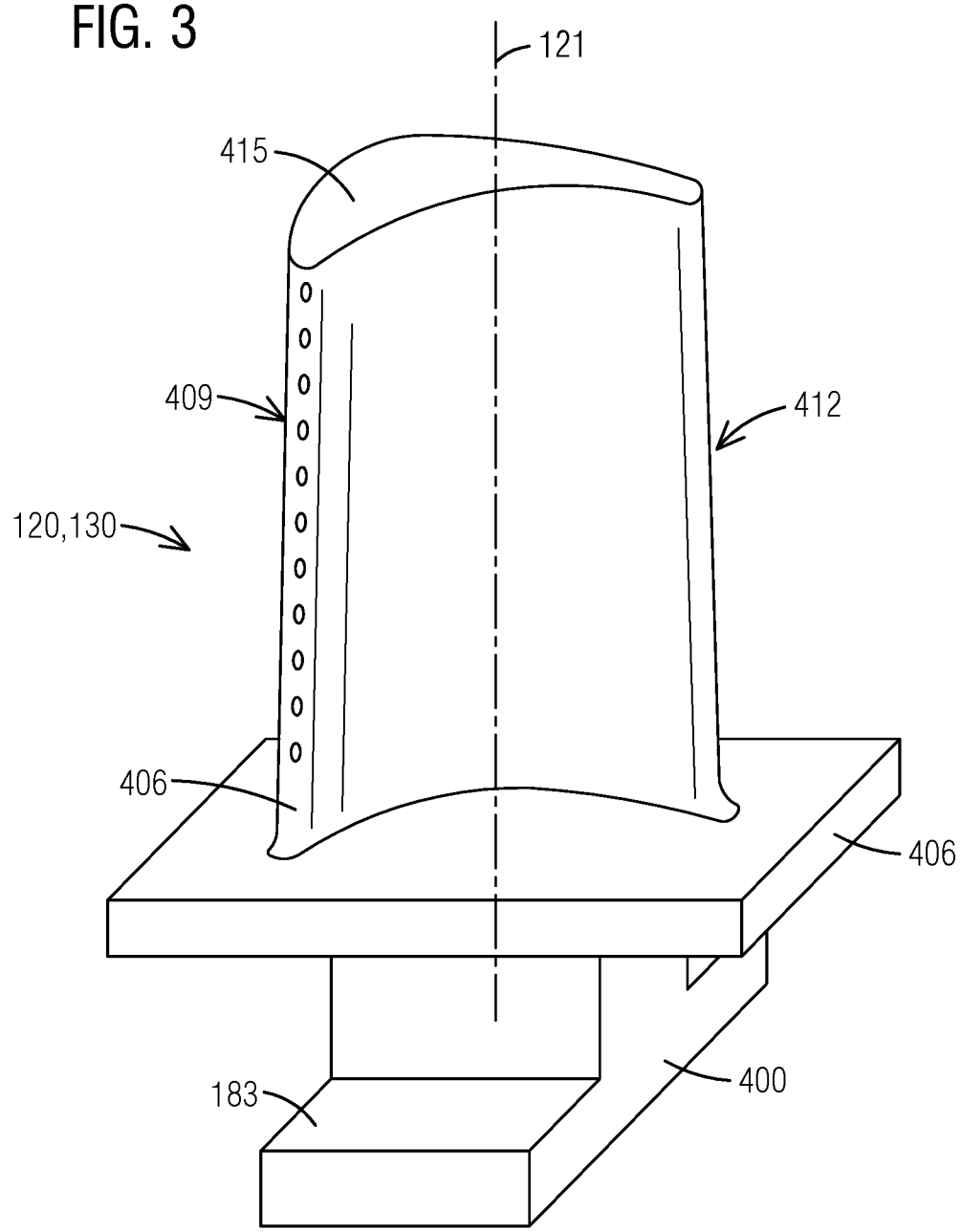

NICKEL BASED SUPERALLOY WELD FILLER

CROSS REFERENCE TO RELATED APPLICATIONS

This application is a continuation in part of application Ser. No. 17/051,468 filed on Oct. 29, 2020 which is the US National Stage of International Application No. PCT/US2018/030385 filed on May 1, 2018 and claims the benefit thereof. All applications are incorporated by reference herein in their entirety.

BACKGROUND

1. Field

The present disclosure relates generally to the field of materials technology, and more particularly, to a nickel-based superalloy weld filler.

2. Description of the Related Art

Of all the high-temperature materials, nickel-based superalloys have the most favorable combination of mechanical properties, resistance to corrosion and processability for gas turbine construction for aircraft and power plants. This is due in part to the fact that nickel-based superalloys can be strengthened by precipitation of a γ' phase. Nevertheless, cracks may still occur over time in nickel-based superalloy components that operate in a harsh environment, such as a gas turbine engine. As the manufacture of these components is complex and costly, efforts are made to repair damaged sections of the components instead of scrapping them all together. Thus, welding nickel-based superalloy components for their refurbishment is a desirable and cost-effective option.

However, welding of nickel-based superalloy materials has been known to be difficult. In order to circumvent the difficult weldability of γ'-hardened nickel-based superalloys, welding is often performed with ductile welding fillers. Commonly used ductile weld fillers, such as IN-625, IN-617, Hast-W, and HA-282, were developed when gas turbine temperatures were relatively cooler than current and future designs. These ductile weld fillers, when used on current gas turbine components that operate at increasingly higher operating temperatures than those in the recent past, may not be able to withstand the oxidation that occurs at higher operating temperatures.

For this reason, there is a need for ductile weld fillers that can withstand higher temperatures than those used in the past.

SUMMARY

Briefly described, aspects of the present disclosure relates to a ductile weld filler and a method for welding nickel based superalloy components.

A first aspect of provides a ductile weld filler having the following composition:
14.6-15.6 wt % chromium;
10.4-11.4 wt % cobalt;
4.6-5.0 wt % molybdenum;
4.4-5.2 wt % tungsten;
1.4-1.8 wt % tantalum;
3.0-3.7 wt % aluminum;
0.7-1.3 wt % titanium;
0.14-0.16 wt % carbon;
0.0425-0.0575 wt. % zirconium;
0.7-1.2 wt % hafnium;
at most 0.15 wt % iron;
at most 0.1 wt % manganese;
at most 0.1 wt % silicon;
at most 70 ppm wt. % magnesium;
at most 0.005 wt % sulfur;
at most 0.1 wt % vanadium;
at most 0.015 wt % boron; and
remainder nickel.

BRIEF DESCRIPTION OF THE DRAWINGS

FIG. 3 illustrates a perspective view of a rotor blade or guide vane.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
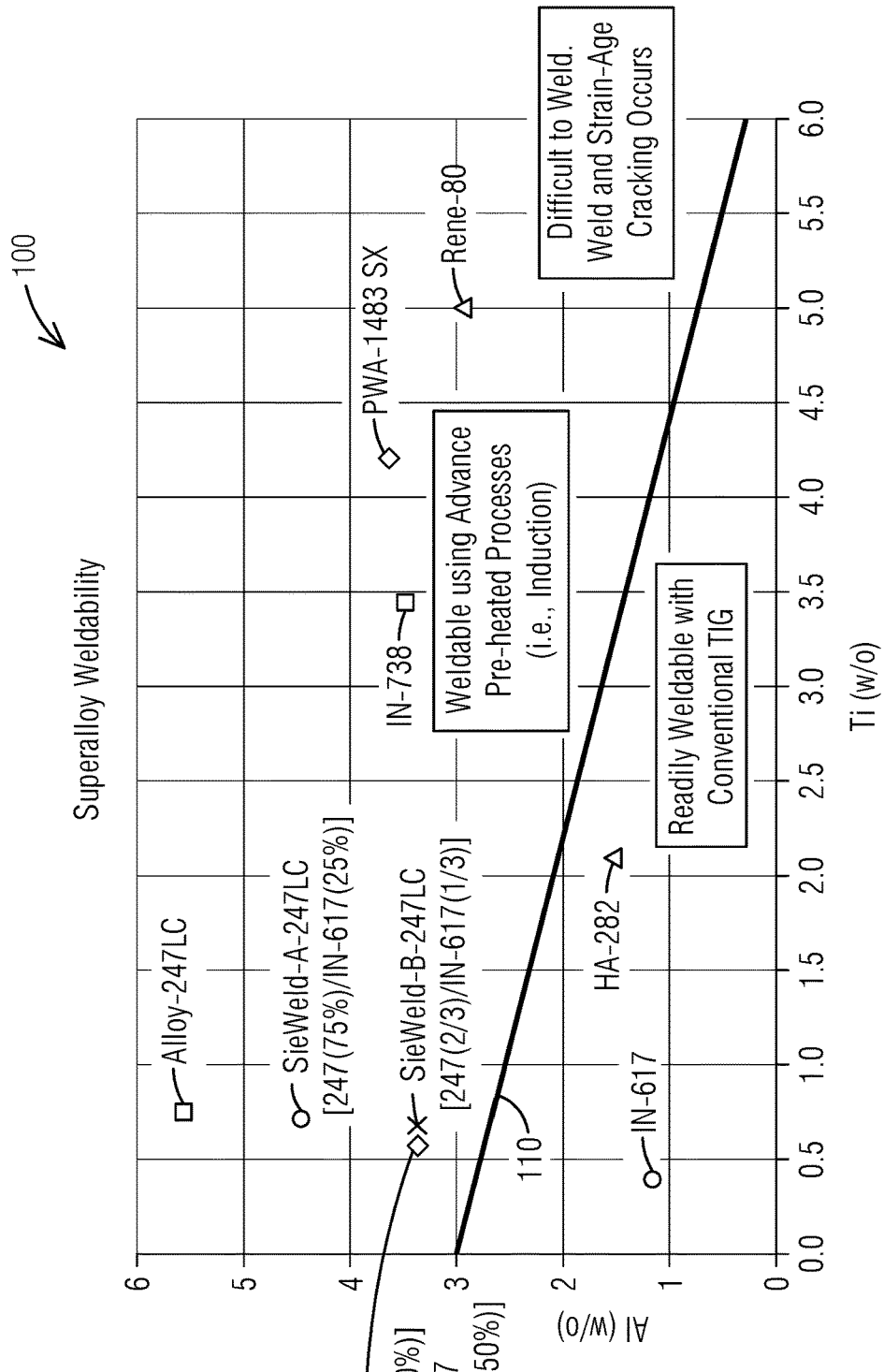
FIG. 1 is a chart illustrating the relative weldability of various superalloys.

Referring now to the figures, where the showings are for purposes of illustrating embodiments of the subject matter herein only and not for limiting the same, FIG. 1 is a chart 100 illustrating superalloy weldability of various base metal and weld filler materials as a function of their aluminium and titanium content. Generally speaking, the higher the aluminium content of the material the more difficult it is to weld. The line 110 depicts a recognized upper boundary of a zone of weldability. The alloys above this line are recognized as being difficult to weld. For example, as the chart illustrates Alloy-247LC is an alloy that is very difficult to weld while IN-617 is readily weldable with a conventional TIG (tungsten inert gas) welding process. As for weld fillers, the chart also illustrates that HA-282 is readily weldable. To those skilled in the art of welding, HA-282 is a very good ductile weld filler, but it will soon be unable to withstand the oxidation that occurs in the relatively higher operating temperatures of current and future designs of gas turbine engines.

The alloy Rene-80 is a nickel-based superalloy that is a very popular aircraft engine base metal, however, it has proven to be oxidation limited in current gas turbine usage. IN-617 is a very good ductile nickel-based superalloy weld filler. IN-617 is particularly useful as it has an increase in ductility in the temperature region 700-900° C., a range in which gas turbines operate, whereas most other superalloys have a decrease in ductility in this temperature range.

The present inventors have recognized that the chemical composition of HA-282 is essentially a 50/50 (in wt. %) mixture of Rene-80 and IN-617 with some minor differences (the W and Fe contents for example). This illustrated in Table 1 shown below which lists the chemical compositions of the base metal Rene-80 in line 1, the weld filler IN-617 in line 2, the 50/50 (in wt. %) mixture of Rene-80 and IN-617 in line 3, and weld filler HA-282 in line 4.

TABLE 1

| | Alloy | | | | | | | | | | | | | | |
|---|---|---|---|---|---|---|---|---|---|---|---|---|---|---|---|
| | Ni | Cr | Co | Mo | W | Ta | Cb/Nb | Al | Ti | Fe | Mn | Si | C | B | Zr |
| Rene 80 | 60 | 14 | 9.5 | 4 | 4 | | | 3 | 5 | 0.1 | 0.1 | 0.1 | 0.17 | 0.015 | 0.03 |
| IN-617 | 52.3 | 22.0 | 12.5 | 9.0 | | | | 1.2 | 0.4 | 1.5 | 0.5 | 0.5 | 0.10 | | |
| 4) Rene-80 - IN-617 50%-50% Most Similar to HA-282 | 56.2 | 18.0 | 11.0 | 6.5 | 2.0 | 0.0 | 0.0 | 2.1 | 2.7 | 0.8 | 0.3 | 0.3 | 0.1 | 0.0 | 0.0 |
| HA-282 | 57 | 20 | 10 | 8.5 | | | | 1.5 | 2.1 | 1.5 | 0.3 | 0.15 | 0.06 | | |

Thus, $$\text{HA-282} \approx \text{Rene-80} + \text{IN-617}. \quad (1)$$

In current gas turbine castings, Alloy-247LC is a base metal of choice as it can withstand the ever increasing gas turbine operating temperatures that can make the gas turbine run more efficiently. Thus, the inventors inventively propose to substitute Alloy-247LC for the base metal Rene-80 in the equation (1) to arrive at a new ductile weld filler which is essentially a mixture of the base metal Alloy-247LC and the ductile weld filler IN-617. The inventive ductile weld filler is thus described by equation (2).

$$\text{Ductile Weld Filler} \approx \text{Alloy-247LC} + \text{IN-617}. \quad (2)$$

The proposed weld filler is a more oxidation resistant weld filler than those weld fillers previously used and thus is much more compatible with currently used base metal alloys, such as Alloy-247LC and IN-738. For example, the properties of ductile weld filler closely match those of the Alloy-247LC and IN-738.

The proposed ductile weld filler includes the following composition:
- 11.0 wt %-15.5 wt % chromium;
- 9.5 wt %-11.0 wt % cobalt;
- 2.0 wt %-5.0 wt % molybdenum;
- 4.5 wt %-7.5 wt % tungsten;
- 1.5 wt %-2.6 wt % tantalum;
- 3.0 wt %-5.0 wt % aluminum;
- 0.4 wt % to 1.0 wt % titanium;
- at most 0.8 wt % iron;
- at most 0.3 wt % manganese;
- at most 0.3 wt % silicon;
- at most 0.1 wt % carbon;
- at most 0.015 wt % boron;
- at most 0.02 wt % zirconium;
- at most 1.2 wt % hafnium;
- at most 0.1 wt % vanadium;
- at most 0.1 magnesium; and
- remainder nickel.

The following table, Table 2, summarizes four exemplary embodiments of the ductile weld filler (details in wt. %), Ductilloy, SieWeld-A-247LC, SieWeld-B-247LC B, and SieWeld-C-247 including the element ranges and the beneficial effects of each element for the alloy. Ductilloy and SieWeld-C-247 is essentially a 50/50 (in a wt. %) mixture of Alloy 247 and IN-617. SieWeld-A-247LC essentially includes a 75/25 (in a wt. %) mixture of the base metal Alloy 247 and weld filler IN-617 while SieWeld-B-247LC includes essentially a 66.6/33.3 (in a wt. %) mixture of the base metal Alloy 247 and weld filler IN-617.

TABLE 2

| | (all values in wt. %) | | | | |
|---|---|---|---|---|---|
| Element | Ductilloy | SieWeld-A-247LC | SieWeld-B-247LC | SieWeld-C-247 | Effect, Beneficial |
| Cr | 14.6-15.6 | 11.2-12.2 | 12.3-13.3 | 14.6-15.6 | Surface Protection, Corrosion Resistance |
| Co | 10.4-11.4 | 9.6-10.6 | 9.8-10.8 | 10.4-11.4 | Precipitation Modification, Improves the solution Annealing Properties |
| Mo | 4.6-5.0 | 2.4-2.8 | 3.1-3.5 | 4.6-5.0 | Solid Solution Strengthening |
| W | 4.4-5.2 | 6.7-7.5 | 5.9-6.7 | 4.4-5.2 | Solid Solution Strengthening |
| Ta | 1.4-1.8 | 2.2-2.6 | 2.2-2.6 | 1.4-1.8 | Solid Solution Strengthening |
| Al | 3.0-3.7 | 4.2-4.8 | 3.8-4.4 | 3.0-3.7 | Precipitate Former |
| Ti | 0.4-1.0 | 0.4-1.0 | 0.4-1.0 | 0.7-1.3 | Precipitate Former |
| Fe | max 0.15 | max 0.15 | max 0.15 | max 0.15 | Joint Base Element |

TABLE 2-continued (all values in wt. %)

| Element | Ductilloy | SieWeld-A-247LC | SieWeld-B-247LC | SieWeld-C-247 | Effect, Beneficial |
|---------|-----------|-----------------|-----------------|---------------|--------------------|
| Mn | max 0.1 | max 0.1 | max 0.1 | max 0.1 | |
| Si | max 0.04 | max 0.04 | max 0.04 | 0.1-0.3 | Precipitate Former, Increases hot cracking |
| C | 0.07-0.08 | 0.07-0.08 | 0.07-0.08 | 0.14-0.16 | Grain Boundary Phases |
| B | max 0.015 | max 0.015 | max 0.015 | max 0.015 | Grain Boundary Phases |
| Zr | 0.005-0.02 | 0.005-0.02 | 0.005-0.02 | 0.02-0.05 | Increases Resistance to Hot Cracking |
| Hf | 0.5-1.0 | 0.9-1.4 | 0.7-1.2 | 0.5-1.0 | Grain Boundary Strengthening |
| V | max 0.10 | max 0.10 | max 0.10 | max 0.10 | Solid Solution Strengthening |
| Ni | Remainder | Remainder | Remainder | remainder | |

It may be desirable to have a weld filler as closely matched as possible in its composition and properties to the base metal to which it will be welded. For example, by matching the coefficient of thermal expansion of the weld filler to the base material as closely as possible, high stress levels due to differential thermal expansion may be avoided. Thus, the embodiment of the weld filler SieWeld-A-247LC would be the closest match to the base metal Alloy-247 for example. Currently, welds in which a nickel based superalloy base metal and the weld filler are identical attempted at room temperature using conventional welding process are not possible due to the formation of cracks in the heat-affected zone and the weld metal.

Figure 2:
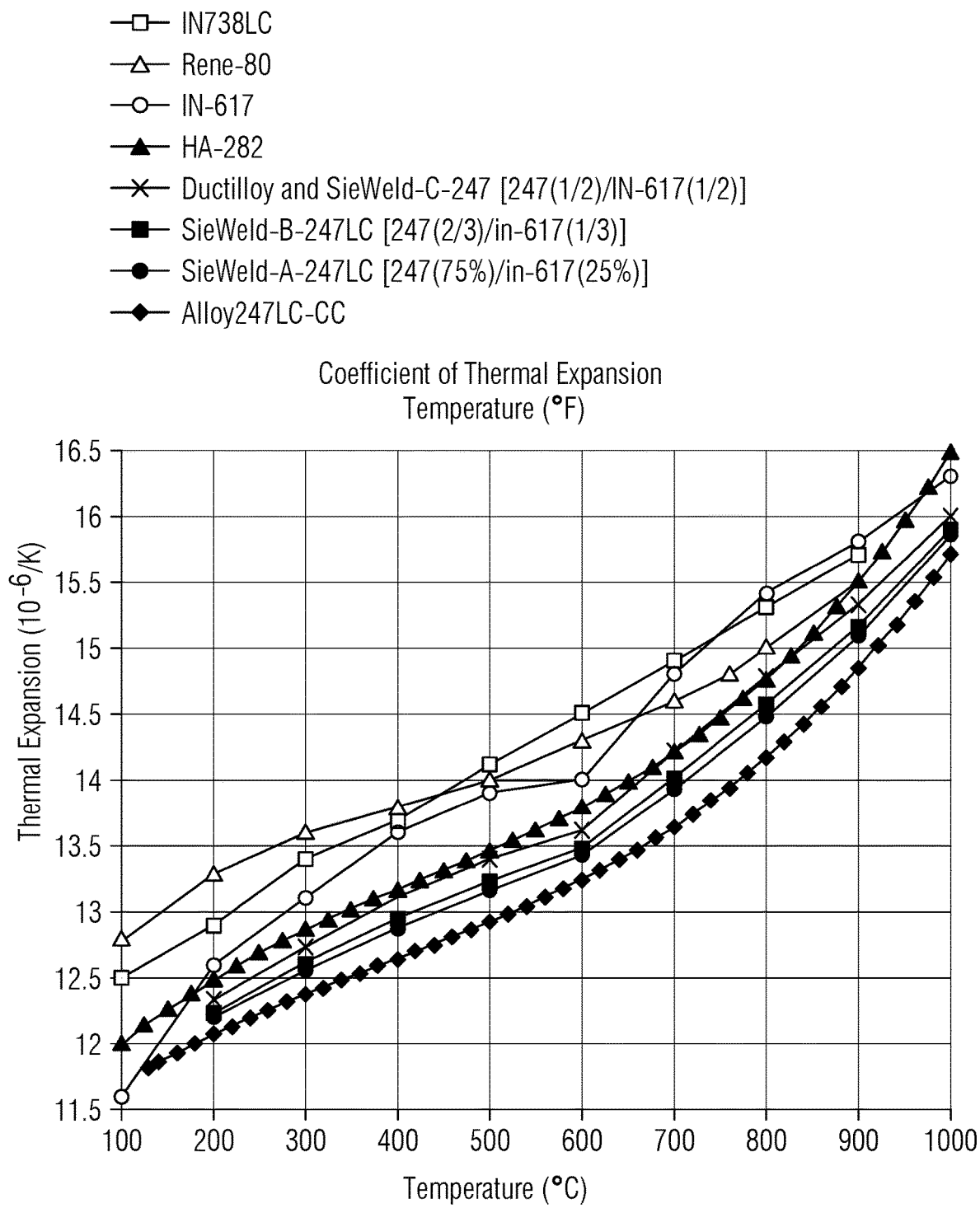
FIG. 2 is a chart of the coefficient of thermal expansion of various weld fillers and superalloy base materials.

Based on its ductility, or tensile elongation, the proposed ductile weld filler will have good welding properties at room temperature. Furthermore, based on its coefficient of thermal expansion the ductile weld filler will have acceptable performance during turbine operation at elevated temperatures. FIG. 2 illustrates the coefficient of thermal expansion of several base metals, Alloy-247LC, IN-738, and Rene 80, weld fillers IN-617, and HA 282, and the proposed weld fillers, Ductilloy/SieWeld-c-247, SieWeld-A-247LC and SieWeld-B-247LC. It may be seen in FIG. 2 that the coefficient of thermal expansion of the proposed embodiments of the weld filler closely match that of Alloy-247LC. Having a weld filler with a closely matched coefficient of thermal expansion to that of the base metal is advantageous because during a weld procedure when high temperatures are applied to the alloys the materials would heat up similarly. By reducing the temperature difference and therefore the stress gradient between the weld joint and the substrate, cracking may be avoided in the weld joint.

In an embodiment, the deleterious trace elements, which may have a detrimental effect on the properties of the weld filler composition, are held to a tight tolerance. These deleterious trace elements may include silicon, carbon, boron, and zirconium. For example, the percentage of these elements shall not exceed the concentrations as listed in Table 2. In an alternate embodiment, (SieWeld-C-247) the trace elements may be relaxed, i.e., the tolerances are looser. In this alternate embodiment, the trace elements may include silicon, titanium, zirconium, carbon, and sulfer.

In an embodiment, the materials Mar-M-247, CM-247LC, PWA-1483, Alloy-247, IN-738, Mar-M002, Rene-N5, Rene-N4, CMSX-4, CMSX-2, Rene-142, GTD-111, MGA-1400, and IN-939 may be welded using the proposed ductile weld filler.

Referring back to FIGS. 1 and 2, a method for welding nickel-based superalloy components is proposed. The ductile weld filler as described above is utilized for welding onto a substrate of the nickel-based superalloy component. The method includes applying the ductile weld filler to a surface of the substrate. The proposed ductile weld filler includes a closely matched coefficient of thermal expansion to that of the substrate. Heat may be applied to the weld filler to melt the weld filler forming molten weld filler. At ambient temperature, the molten weld filler is utilized to weld the substrate. The welded substrate is allowed to cool and resolidify whereby a solidified joint is produced on the substrate. For the purposes of the disclosure, closely matched refers to having a coefficient of thermal expansion within 3% of Alloy-247LC in the range 600°-1000° C., the range in which gas turbines currently operate.

FIG. 3 illustrates a perspective view of a rotor blade 120 or guide vane 130 of a turbo machine, which extends along a longitudinal axis 121. The turbo machine may be a gas turbine of an aircraft or of a power plant for generating electricity, a steam turbine or a compressor. The blade or vane 120, 130 has, in succession along the longitudinal axis 121, a securing region 400, an adjoining blade or vane platform 403 and a main blade or vane part 406. As a guide vane 130, the vane 130 may have a further platform (not shown) at its vane tip 415. A blade or vane root 183, which is used to secure the rotor blades 120, 130, to a shaft or disk (not shaft), is formed in the securing region 400. The blade vane root 183 is designed, for example, in hammerhead form. Other configurations, such as fir-tree or dovetail root, are possible. The blade or vane 120, 130 has a leading edge 409 and a trailing edge 412 for a medium which flows past the main blade or vane part 406. In the case of conventional blades or vanes 120, 130 by way of example, solid metallic materials, in particular superalloys, are used in all regions 400, 403, 406 of the blade or vane 120, 130. Thus, the ductile weld filler may be utilized for welding all the regions of the blade or vane for example. Additionally, other combustion components may also be welded using the proposed ductile weld filler.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A ductile weld filler material, comprising (SieWeld C):
   14.6-15.6 wt % chromium;
   10.4-11.4 wt % cobalt;
   4.6-5.0 wt % molybdenum;
   4.4-5.2 wt % tungsten;
   1.4-1.8 wt % tantalum;
   3.0-3.7 wt % aluminum;
   0.7-1.3 wt % titanium;
   0.14-0.16 wt % carbon;
   0.02-0.05 wt. % zirconium;
   0.5-1.0 wt % hafnium;
   at most 0.15 wt % iron;
   at most 0.1 wt % manganese;
   0.1-0.3 wt % silicon;
   at most 70 ppm wt. % magnesium;
   at most 0.1 wt % vanadium;
   at most 0.015 wt % boron; and
   remainder nickel
   wherein the ductile weld filler material is weldable at room temperature without cracking.

2. The ductile weld filler material as claimed in claim 1, wherein the filler comprises 14.9-15.2 wt. % chromium.

3. The ductile weld filler material as claimed in claim 1, wherein the filler comprises 4.6-4.9 wt. % molybdenum.

4. The ductile weld filler material as claimed in claim 1, wherein the ductile weld filler comprises a powder.

5. The ductile weld filler material as claimed in claim 1, wherein the ductile weld filler comprises a wire.

6. A ductile weld filler material, comprising:
   14.6-15.6 wt % chromium;
   10.4-11.4 wt % cobalt;
   4.6-5.0 wt % molybdenum;
   4.4-5.2 wt % tungsten;
   1.4-1.8 wt % tantalum;
   3.0-3.7 wt % aluminum;
   0.7-1.3 wt % titanium;
   0.14-0.16 wt % carbon;
   0.0425-0.0575 wt. % zirconium;
   0.7-1.2 wt % hafnium;
   at most 0.15 wt % iron;
   at most 0.1 wt % manganese;
   at most 0.1 wt % silicon;
   at most 70 ppm wt. % magnesium;
   at most 0.005 wt % sulfur;
   at most 0.1 wt % vanadium;
   at most 0.015 wt % boron; and
   remainder nickel,
   wherein the ductile weld filler material comprises a powder.

7. The ductile weld filler material as claimed in claim 6, wherein the filler comprises 14.9-15.2 wt. % chromium.

8. The ductile weld filler material as claimed in claim 6, wherein the filler comprises 4.6-4.9 wt. % molybdenum.

9. A ductile weld filler material, comprising:
   14.6-15.6 wt % chromium;
   10.4-11.4 wt % cobalt;
   4.6-5.0 wt % molybdenum;
   4.4-5.2 wt % tungsten;
   1.4-1.8 wt % tantalum;
   3.0-3.7 wt % aluminum;
   0.7-1.3 wt % titanium;
   0.14-0.16 wt % carbon;
   0.0425-0.0575 wt. % zirconium;
   0.7-1.2 wt % hafnium;
   at most 0.15 wt % iron;
   at most 0.1 wt % manganese;
   at most 0.1 wt % silicon;
   at most 70 ppm wt. % magnesium;
   at most 0.005 wt % sulfur;
   at most 0.1 wt % vanadium;
   at most 0.015 wt % boron; and
   remainder nickel,
   wherein the ductile weld filler material has a coefficient of thermal expansion that is within 3% of Alloy-247LC between the temperatures of 600-1000 degree Celsius and the ductile weld filler comprises a powder.

10. The ductile weld filler material as claimed in claim 9, wherein the filler comprises 14.9-15.2 wt. % chromium.

11. The ductile weld filler material as claimed in claim 9, wherein the filler comprises 4.6-4.9 wt. % molybdenum.

12. The ductile weld filler material as claimed in claim 9, wherein the ductile weld filler comprises a wire.

* * * * *